June 7, 1932.  S. H. WHISNER  1,861,672
AUTOMOBILE COOKER
Filed Oct. 25, 1930
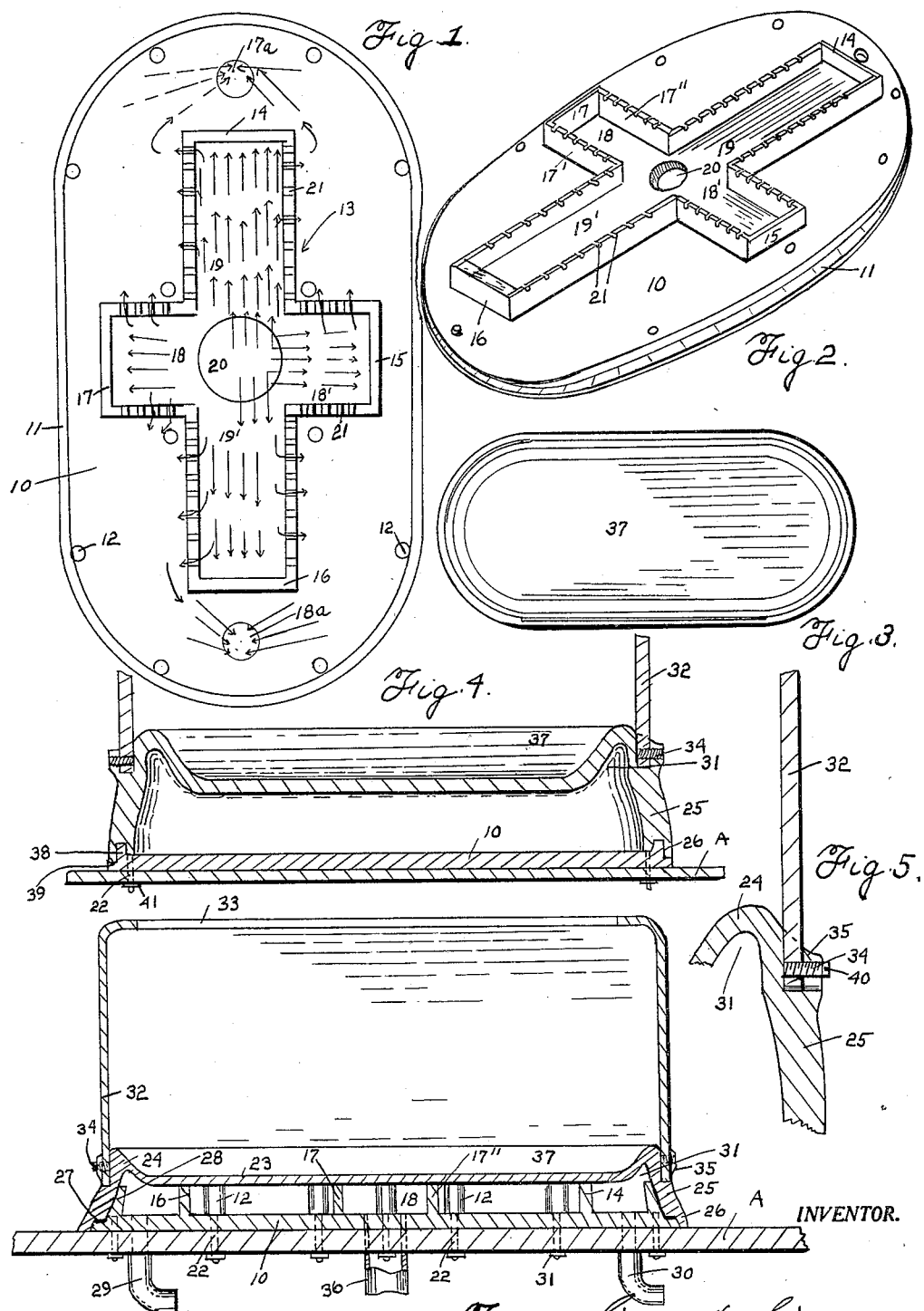
INVENTOR.
Sidney H. Whisner Patented June 7, 1932

1,861,672

UNITED STATES PATENT OFFICE

SIDNEY H. WHISNER, OF LOS ANGELES, CALIFORNIA

AUTOMOBILE COOKER

Application filed October 25, 1930. Serial No. 491,177.

This invention relates to improvements in stoves and cookers and more particularly to automobile cookers.

One of the objects of this invention is to provide a simple, efficient and inexpensive cooker designed to be secured upon the running board of an automobile and the like for instant service.

Another object of the present invention is to provide a stove for particular use upon an automobile for the purpose of making use of the hot exhaust gases liberated by the internal combustion engine of the car, as the fuel with which to heat the stove quickly.

A still further object of this invention is to provide an automobile cooker or stove characterized by the feature of economical construction and instantaneous serviceability.

One of the important purposes of this invention is to provide in conjunction with a stove a heating chamber therebelow in which is arranged a cruciform-shaped hollow compartment in the center of which the hot exhaust gases are led from the engine of the car, so that they will be diffused in all opposing directions from said compartment to heat the hot plate of the stove in the shortest period of time.

A still further object of this invention is to provide, in an automobile cooker or stove means whereby the hot gases employed as fuel in this stove are designed to be diffused as much as possible at the center of the hot plate of the stove and remotely from the rim of the stove, thereby providing a path for the hot gases to cool as they pass out from the cruciform-shaped heating compartment to escape.

Another object of this invention is to provide a stove whose parts may be readily taken apart and consisting of a hot plate, an air chamber thereabove, and a heating chamber therebelow, the heating chamber being provided upon a base plate closing the heating chamber and providing an arrangement whereby the hot gases introduced into the stove will be kept away from direct contact with the rim or wall of the stove to prevent the formation of hot points upon the parts of the stove directly exposed to touch by the person using the stove to cook with. By means of the parts of my invention the hot plate is quickly heated from the central source of heating, without the heat becoming intensified at the rim of the stove.

With the above and other objects in view my invention consists in the combination, arrangement and details of construction disclosed in the drawing and specification, and then more particularly pointed out in the appended claims.

In the drawing, wherein similar reference characters designate similar parts thruout the respective views, Figure 1 is a top plan view of the base plate removed from the hot plate of the stove, Figure 2 is a perspective view of the base plate showing the cruciform-shaped hot gas enclosure, Figure 3 is a top plan view of the dish-shaped hot plate of the stove, Figure 4 is a sectional elevation of the stove, in one of its modifications, Figure 5 is a fragmental detail sectional view of an end of the stove showing the manner of securing the side of the air chamber thereto, Figure 6 is a sectional elevation of the completed stove showing the heating chamber, the hot plate, and air chamber, with connections leading to the exhaust pipe of an automobile.

In the drawing, which is merely illustrative of my invention the parts of my invention are disclosed. A designates the running board of an automobile and resting in surmounted relation thereupon is the base plate 10 of the cooker or stove forming the imperforate bottom thereof. This base plate is a casting upon which has been formed a marginal rim 11 extending all around the edge of the base plate, this marginal rim being a flange of less thickness than the main body portion of the base plate 10.

There will be secured centrally upon the base plate 10 a member designed to provide a diffusion chamber for the hot exhaust gases from the very moment that said gases are introduced therein. This member is a cruciform-shaped metal flange or body providing a hollow interior chamber. It may be formed integrally upon the base plate as shown in Figure 1, but it is proposed to secure this member upon the base plate by means of the integral lugs 12 formed at convenient points upon the exterior face of this member.

The cruciform body consists of the longitudinally separated oppositely arranged rectangular parts 14 and 16, and the right angularly disposed shorter transverse parts 15 and 15, all of these parts having three sides and intercommunicating centrally of the cruciform body. Formed upon the top edges of this body except at the closing ends of the parts 14, 15, 16 and 17, are a series of spaced notches 21 being air ports. Formed centrally of the base plate 10, which may be of rounded configuration shown in Figure 2, is a large opening 20, and this base plate is also formed at opposing ends, but outside of the cruciform enclosure with the holes 17a, 18a which are the exhaust ports. The base plate is also formed at spaced apart points of its perimeter with the series of bolt holes 12.

The cruciform body is laid down in surmounted relation upon the base plate A, and the screw shanks 22 depending from the lugs 12 thereof are caused to project thru holes formed in the running board A or similar support, and then nuts 31 are screwed home upon the lowermost ends of these shanks thereby effectively clamping the stove down upon the runing board. As thus positioned, it will be seen that the cruciform body has its sides spaced away from the marginal edge of the base plate.

The stove proper is composed of a downwardly flaring rim or base 25 formed with a shoulder as at 27, which rests upon a packing strip which in turn rests upon the rebated portion or flange 11 of the base plate. The hot plate 23 is dished-out so as to be concavo-convex in configuration, and it is formed in such a manner upon the rim 25 of the hot pan that there will be an extensive groove 35 between the bottom of the plate and the adjacent rim providing a cooling area at this point. There are lugs 28 formed upon the base plate which abut the inner face of the rim 25. Connected directly to the opening 20 is the pipe 36 forming a connection for conducting hot gases into the hollow interior of the cruciform enclosure or member. When the base plate has been clamped onto the rim of the stove and proper bolts enter the holes 12 for this purpose, to which nuts are secured, the upper edges of this cruciform body will contact the bottom of the hot plate 23, and in this manner the interior space in this member is closed, altho the ports 21 allow for escape of the hot exhaust gases.

The rim 25 is formed with a coextensive ledge or shoulder presenting a horizontal surface upon which may and will rest and be supported the lower edge of a fire-box or air chamber of box-like formation designated 32, and this box will be retained in position and against displacement by the set screws 34 tapped into lugs 35 formed integrally upon the rim 25 and overlapping the outer face of this box. The screw-driver notches of the set screws 34 are designated 40.

37 designates the dish-shaped depression of the hot plate of the stove. 29 and 30 designate respectively two exhaust pipes which connect with the openings 17a, 18a in the base plate. The hollow spaces of the rectangular parts 14, 15, 16 and 17 of the cruciform body are designated respectively 19, 18', 18, and 19'. The articles of food are placed upon the hot plate 23 thru the opening 33 in the air box 32 either in bulk or in utensils. By opening a suitable valve (not shown) which may be located in the exhaust pipe but controlled by a cut-out, the exhaust line may be connected to the stove, and the passage opened for the hot exhaust gases to flow upwardly thru the pipe 36, to emerge out of the port 20 and thus enter the cruciform-shaped body and gas diffuser. The arrows indicate the directions taken by the hot gases when they emerge from the opening 20. The gases spread out in all directions and impact the under side of the hot plate 23, and at these points within the cruciform-shaped body the gases are hottest. The gases may discharge thru the ports 21 into the chamber formed around this body and the gases now lose heat and pass to the ends of the heating chamber and make their exit thru the holes 17a, 18a to the atmosphere after passing out of the pipe elbows 29, 30. Hence it will be seen that there are no hot points along the outer face of the stove as would be the case were the hot gases liberated to directly and suddenly impinge upon these surfaces, instead of the gases that have already spent their heat as in the present instance. Therefore, the stove will not be as hot along its perimeter as in its central portion. I do not mean to confine myself to the exact details of construction but cover all variations falling within the purview of the appended claims.

What I desire to claim and secure by Letters Patent is:—

1. As a new article of manufacture, a cooker consisting of a hot plate, an air chamber and cover extending therearound and thereabove, and open at its top, a base supporting the hot plate and providing an intervening chamber, a cruciform-shaped hot-gas diffuser arranged centrally in the intervening chamber and contacting the hot plate, means conducting hot gases centrally of and into the diffuser, means whereby the hot gases escape from the diffuser, externally thereof, there being a marginal free path for the conveyance of the escaping gases to a point of discharge at the ends of the intervening chamber.

2. A device of the kind described consisting of a hot plate having a marginal depending rim, a base fitting the lower edge of the rim of the hot plate and providing a chamber with the rim, a cruciform-shaped perforated hot gas diffuser located centrally of the chamber and receiving in its enclosure and centrally the hot gases for heating the hot plate, exhaust ports being formed at the ends of the base externally of the diffuser, whereby gases escaping thru the ports of the diffuser may vent thru these ports.

3. A device of the kind described consisting of a hot plate having a marginal under rim, a base plate closing the lower edge of the rim and providing a chamber, an air chamber surrounding the rim and extending upwardly, being open at its upper end, an enclosure disposed centrally of the base and receiving hot gases centrally thereof and diffusing the same in all directions, means allowing the hot gases to escape out of said enclosure so it may spread towards the ends of the chamber externally of the enclosure, and means for venting the exhaust gases reaching the ends of the chamber.

4. A device of the kind described consisting of a dish-shaped hot plate, an air chamber located above the hot plate and providing a food enclosure, a hollow base below the hot plate, a closure plate at the lower edge of the hollow base, a hot gas diffuser device having its under edge resting upon the closure plate and having its upper edge engaging the under side of the hot plate, means securing the diffuser device in position, said diffuser device having its walls spaced out of contact with the wall of the hollow rim for providing a gas cooling jacket enveloping the device, said closure plate having a pipe conveying hot gases into the central part of the diffuser device, and also formed with openings at the ends of the closure plate externally of the diffuser device, and means for allowing the hot gases to be discharged from the diffuser device to vent thru said openings.

5. A device of the kind described, consisting of a stove composed of a hot plate and a downwardly extending and flaring marginal sustaining rim, a closure plate having its marginal edge fitted into the lower part of the rim and closing the stove, an integral cruciform-shaped hollow body formed centrally of the closure plate with an opening at the center of said hollow body, and with openings opposite the end walls but externally of the cruciform-shaped body, said hollow body having its upper edge contacting the hot plate so as to be closed thereby.

6. In a device as described, in combination a stove consisting of a downwardly flaring rim, a hot plate formed upon the upper part of the rim in dish-shaped formation, being concavo-convex in configuration, there being a perimetral groove between the bottom of the hot plate and the adjacent wall of the rim, a base plate having its marginal edge dovetailed into the wall of the rim and having its under side flush with the lower edge of said rim, a cruciform-shaped upstanding flange formed upon the base plate centrally thereof, upon whose outer edges air ports are formed, said flange contacting the hot plate so that it is closed by the latter, leaving the hot gases to escape thru said ports, said base plate having an opening enclosed at all points by said flange, and means for securing the base plate into said rim, there being holes formed on the base plate at opposite ends thereof externally of the flange.

7. In combination a stove consisting of a hot plate and a supporting rim, a base plate secured so as to close the bottom of the stove, a cruciform flange providing a hollow enclosure centrally upon the base plate, and having integral lugs at spaced about points of its perimeter, said lugs having depending screw threaded shanks projecting thru the base plate, a support thru which the lower threaded shanks project, nuts screwed home upon the shanks for securing the stove upon said support, to clamp said flange upon the hot plate to provide a chamber for hot gases, means introducing hot gases into said chamber centrally thereof, and means at the ends of the base plate outside said chamber for receiving and venting the gases leaving the chamber, said flange being formed with a series of spaced apart notches allowing the hot gases therein to escape.

Signed at Los Angeles, California.

SIDNEY H. WHISNER.